No. 877,391.
PATENTED JAN. 21, 1908.
G. M. WILSON.
SHOCK ABSORBER.
APPLICATION FILED MAY 20, 1907.
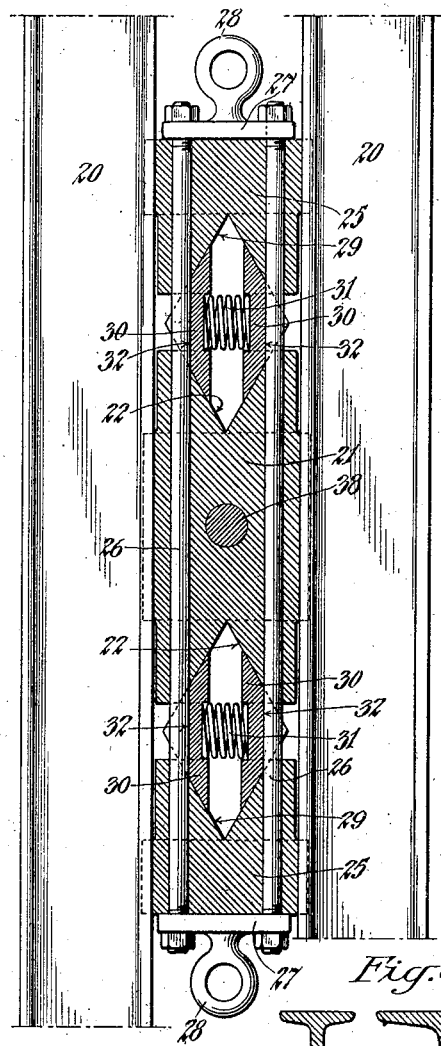
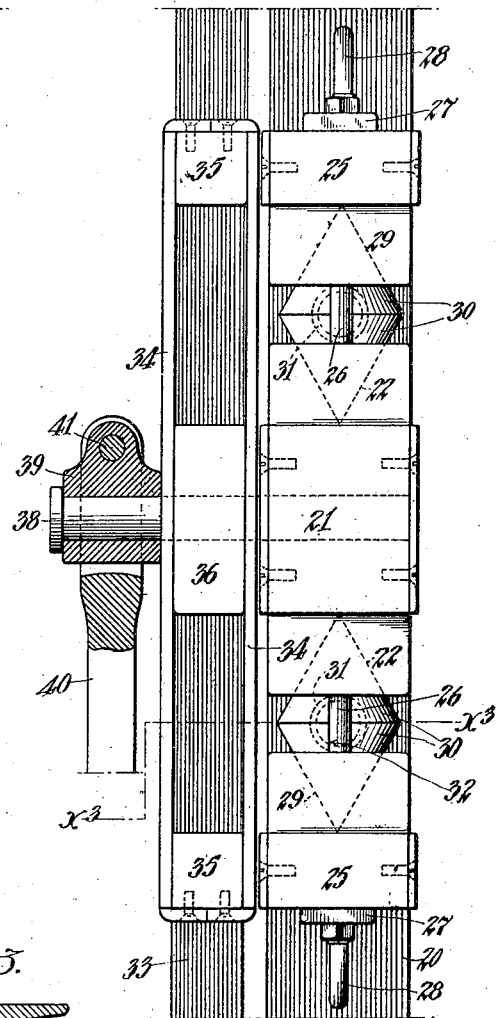
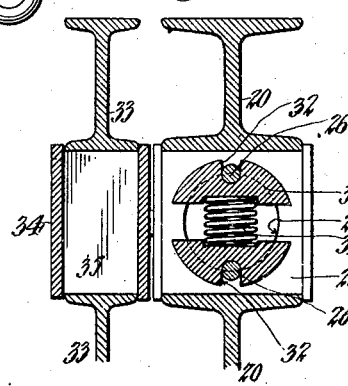
Witnesses:—
Inventor,
George M. Wilson

UNITED STATES PATENT OFFICE.

GEORGE M. WILSON, OF LOS ANGELES, CALIFORNIA.

SHOCK-ABSORBER.

No. 877,391.  Specification of Letters Patent.  Patented Jan. 21, 1908.

Application filed May 20, 1907. Serial No. 374,794.

*To all whom it may concern:*

Be it known that I, GEORGE M. WILSON, a citizen of the United States, residing at Los Angeles, in the county of Los Angeles and State of California, have invented a new and useful Shock-Absorber, of which the following is a specification.

This invention relates to shock absorbers, and particularly to one especially adapted for use in wave motors to be employed intermediate of the float and the elements operated thereby, and the object of the invention is to prevent shock to the driving or driven elements.

The accompanying drawings illustrate the invention, and referring thereto:—Figure 1 is a front elevation of the vertical ways showing the shock absorber in longitudinal cross section in position thereon. Fig. 2 is a side elevation of the device, part of the connecting rod being shown in cross section. Fig. 3 is a cross section on line $x^3$—$x^3$ Fig. 2.

20 designates vertical ways between which is slidably mounted a cross head 21 having upper and lower conical seats 22. Terminal blocks 25 are arranged above and below the cross head 21, the terminal blocks 25 being slidable in ways 20 and also slidable on bolts 26 which connect cross bars 27 to limit the amount of movement of the terminal blocks away from the cross head.

Rings 28 are provided on the cross bars 27 for the attachment of cables not shown. Each terminal block 25 is provided with a conical seat 29, similar in form to the conical seats 22 in cross head 21. Pressure cones are arranged in each pair of seats 22 and 29, each pressure cone comprising two members 30 having rounded faces which fit the seats 22 and 29. Between the two members of each pressure cone is a coiled compression spring 31 which spreads the members of the pressure cone apart and holds them against the conical seats 22 and 29. Each member 30 has a groove 32 which slides over the adjacent bolt 26. This prevents the pressure cones from rotating.

Arranged parallel with the ways 20 are ways 33, between which is slidably mounted a strap 34 provided in each end with blocks 35 and at the center with a block 36. A pin 38 is fastened to cross head 21 and extends through the block 36, and journaled on pin 38 is a block 39. A connecting rod 40 is pivoted at 41 to the block 39, thus giving a universal movement of the connecting rod 40 at this point relatively to the block 36. The connecting rod 40 is operated by the float of the wave motor not shown.

In operation the strap 34 and terminal blocks 25 are operated up and down along the ways by the connecting rod 40. During the up stroke, a load being attached through the cable, not shown, to the lower eye 28, the upward movement of the cross head 21 first compresses the upper pressure cones, and the latter act to lift the upper terminal block and cross bar 27, and the latter pulling on bolts 26 raises the lower eye 28 and thus acts upon the load. If this upward movement is abrupt, the pressure cones will be contracted by being squeezed together through the medium of the conical seats of the terminal block and cross head approaching each other. As the pressure cones are thus contracted, the spring 31 is compressed, and when it has been compressed to a certain point determined by the load, the spring will fail to be compressed further and will prevent the pressure cones from further contracting which will result in moving up the cross head 21 at a speed equal to that of the terminal block 25. In this way shock is absorbed and the load is started gradually and easily. If the device should be used in a relation wherein the upper eye 28 actuated the load during the down stroke, then the operation would be similar to the foregoing described operation, except that the shock absorbing functions would be carried out reversely by the lower set of pressure cones and related parts.

What I claim is:

1. In a shock absorber, a cross head, a terminal block slidable with relation to the cross head, means for limiting the relative movement between the cross head and the terminal block, the cross head having a conical seat and the terminal block having a conical seat, and a pressure cone comprising two members in said seats with a compression spring between said members.

2. A shock absorber comprising a cross head, a connecting rod connected with a universal joint to the cross head, a terminal block, bolts passing loosely through the terminal block and passing loosely through the cross head, cross bars connected to both ends of said bolts, eyes on the cross bars for the attachment of cables, the terminal block and the cross head having conical seats, a divided pressure cone in said seats, and a compression spring between the two members of the pressure cones.

3. A shock absorber comprising a cross head, a connecting rod connected with a universal joint to the cross head, terminal blocks above and below the cross head, bolts extending loosely through the cross head and passing through the terminal blocks, cross bars connected to both ends of said bolts, an eye on each cross bar for the attachment of a cable, terminal blocks and the cross head having conical seats, divided pressure cones in said seats, and a compression spring between the two members of each pressure cone, the members of each pressure cone having grooves which slide over the respective bolts.

In testimony whereof, I have hereunto set my hand at Los Angeles, California, this 13th day of May, 1907.

GEORGE M. WILSON.

In presence of—
GEORGE T. HACKLEY,
FRANK L. A. GRAHAM.